US 8,970,510 B2
(12) United States Patent
Liu et al.

(10) Patent No.: US 8,970,510 B2
(45) Date of Patent: Mar. 3, 2015

(54) EMBEDDED TOUCH SENSITIVE DISPLAY AND METHOD OF MANUFACTURING THE SAME

(75) Inventors: Chen-Yu Liu, Taipei (TW); Ching-Yi Wang, Zhongli (TW)

(73) Assignee: TPK Touch Solutions Inc., Taipei (TW)

( * ) Notice: Subject to any disclaimer, the term of this patent is extended or adjusted under 35 U.S.C. 154(b) by 757 days.

(21) Appl. No.: 12/859,272

(22) Filed: Aug. 19, 2010

(65) Prior Publication Data

US 2011/0175828 A1     Jul. 21, 2011

(30) Foreign Application Priority Data

Jan. 21, 2010   (TW) ............................... 99101623 A

(51) Int. Cl.
G06F 3/041        (2006.01)
G02F 1/1333       (2006.01)
G06F 3/044        (2006.01)
G06F 3/045        (2006.01)
G06F 3/0488       (2013.01)

(52) U.S. Cl.
CPC .......... G06F 3/0412 (2013.01); G02F 1/13338 (2013.01); G06F 3/044 (2013.01); G06F 3/045 (2013.01); G06F 3/0488 (2013.01)
USPC ........................................................ 345/173

(58) Field of Classification Search
CPC .. G06F 3/0412; G06F 3/0488; G02F 1/13338
USPC .................................................. 345/173–178
See application file for complete search history.

(56) References Cited

U.S. PATENT DOCUMENTS

| 4,469,410 | A | 9/1984 | Ikesue |
| 5,113,273 | A | 5/1992 | Mochizuki et al. |
| 5,929,959 | A | 7/1999 | Iida et al. |
| 7,369,122 | B2* | 5/2008 | Cross et al. .................. 345/173 |
| 7,948,477 | B2* | 5/2011 | Hotelling ...................... 345/173 |
| 8,049,828 | B2* | 11/2011 | Liu et al. ......................... 349/40 |
| 2002/0063694 | A1* | 5/2002 | Keely et al. .................. 345/173 |
| 2003/0197688 | A1* | 10/2003 | Aufderheide et al. ........ 345/173 |
| 2006/0007165 | A1* | 1/2006 | Yang et al. .................... 345/173 |
| 2007/0074914 | A1 | 4/2007 | Geaghan et al. |
| 2009/0189875 | A1* | 7/2009 | Ma ................................. 345/174 |
| 2010/0045612 | A1* | 2/2010 | Molne .......................... 345/173 |

FOREIGN PATENT DOCUMENTS

| CN | 1595268 | 3/2005 |
| CN | 1637550 | 7/2005 |

(Continued)

Primary Examiner — Dwayne Bost
Assistant Examiner — Larry Sternbane
(74) Attorney, Agent, or Firm — Gokalp Bayramoglu

(57) ABSTRACT

The present invention relates to an embedded touch sensitive display, which includes a liquid crystal display (LCD), a touch sensing layer, a touch signal transfer circuit and a conductive media. The liquid crystal display comprises a top substrate, a bottom substrate, and a liquid crystal layer which is configured between the top substrate and the bottom substrate. The touch sensing layer is disposed below the top substrate of the LCD for generating touch signals after sensing an outside touch action, and the touch signal transfer circuit is disposed above the bottom substrate of the LCD. The conductive media is disposed between the touch sensing layer and the touch signal transfer circuit for transferring the touch signals between the touch sensing layer and the touch signal transfer circuit.

38 Claims, 7 Drawing Sheets

(56) References Cited

FOREIGN PATENT DOCUMENTS

| | | |
|---|---|---|
| CN | 101266348 A | 9/2008 |
| CN | 101414067 A | 4/2009 |
| EP | 1936479 A1 | 6/2008 |
| JP | 58184933 | 10/1983 |
| JP | 62159125 | 7/1987 |
| JP | 62240934 | 10/1987 |
| JP | 2009104131 A | 5/2009 |
| TW | 200909915 A | 5/2009 |
| TW | 200919285 A | 5/2009 |

* cited by examiner

EMBEDDED TOUCH SENSITIVE DISPLAY AND METHOD OF MANUFACTURING THE SAME

BACKGROUND OF THE INVENTION

This application claims the benefit of Taiwan application No. 099101623, filed on Jan. 21, 2010.

FIELD OF THE INVENTION

The present invention relates to an embedded touch sensitive display.

DESCRIPTION OF THE RELATED ART

Touch sensitive displays have been widely used in electronic devices, such as portable and hand-held electronic devices. Touch sensitive displays incorporate Sensing Technology (such as resistive, capacitive, infrared touch, acoustic sensing, optical sensing technology) and display technology. Mature liquid crystal display (LCD) developments further facilitate the integration of sensing technologies and the LCD.

FIG. 1A is a schematic top view showing a conventional touch sensitive LCD (touch sensitive LCD is hereinafter referred to as the "touch sensitive display"), and FIG. 1B is a schematic cross-sectional view taken along a sectional line 1B-1B" in FIG. 1A. As shown in FIG. 1A, the entire touch sensitive display is divided substantially into a display area (or active area) A, a peripheral area B, a first bonding area C1 and a second bonding area C2. As shown in FIG. 1B, the structure of the touch sensitive display mainly includes a top substrate 1, a bottom substrate 2 and a liquid crystal layer 3 which is between the top and bottom substrates 1, 2. Moreover, it also includes other display components between the top substrate 1 and the bottom substrate 2, such as a top transparent conductive layer 4, a conductive adhesive 5, a bottom transparent conductive layer 6, a conductive circuit 7 and so on. The aforementioned layer/component 3, 4, 5, 6, and 7 and so on are collectively referred to as the "display components".

The bottom substrate 2 which is disposed at one side of the second bonding area C2 is coupled to a (display-controlled) flexible printed circuit board (flexible PCB) 8. The bottom substrate 2 is controlled by a display controller (not shown) to transfer the required common voltage which is transmitted to the top transparent conductive layer 4 via the flexible printed circuit board 8, the bottom transparent conductive layer 6, the conductive circuit 7 and the conductive adhesive 5.

The touch sensing layer 9 of the conventional touch sensitive display is disposed above the first bonding area C1 of the top substrate 1, and one side of the touch sensing layer 9 is coupled to another (touch-sensitive-controlled) flexible printed circuit board 10. Touch signals generated from the display area A are transferred to the touch sensitive controller (not shown) via the touch sensing layer 9 and the flexible printed circuit board 10. The touch sensing layer 9 and the flexible printed circuit board 10 are collectively referred to as the "touch components".

The touch sensing layer 9, the flexible printed circuit board 10 and the display components mentioned above of the conventional touch sensitive display are disposed above and under the top substrate 1 respectively. The top substrate 1 must be reversed to manufacture the display components mentioned above individually in manufacturing the conventional touch sensitive display, and which results in complex manufacturing steps. Moreover, the flexible printed circuit board 8 and the flexible printed circuit board 10 are configured in the second bonding area C2 of the bottom substrate 2 and the first bonding area C1 of the top substrate 1 respectively. Therefore it is not easy to achieve the miniaturized design. Accordingly, the need of proposing a novel touch sensitive display structure and a manufacturing method for solving above problem is arising.

SUMMARY OF THE INVENTION

In view of the foregoing, it is an object of the embodiment of the present invention to provide an embedded touch sensitive display for simplifying manufacturing steps and achieving the miniaturized design.

The embedded touch sensitive display according to the embodiments of the present invention (hereinafter "embedded touch sensitive display") comprises at least one liquid crystal display, a touch sensing layer, a touch signal transfer circuit and a conductive media. Wherein, the liquid crystal display comprises a top substrate, a bottom substrate and, a liquid crystal layer. The touch sensing layer is disposed below the top substrate for generating touch signals after sensing an outside touch action, and the touch signal transfer circuit is disposed above the bottom substrate. The conductive media is disposed between the touch sensing layer and the touch signal transfer circuit for transferring the touch signals between the touch sensing layer and the touch signal transfer circuit.

BRIEF DESCRIPTION OF THE DRAWINGS

Skilled persons in the art will understand that the drawings, described below, are for illustration purposes only and do not limit the scope of the present invention in any way. In the drawings, like reference numerals designate corresponding parts throughout the several views.

DETAILED DESCRIPTION OF THE INVENTION

Figure 2:
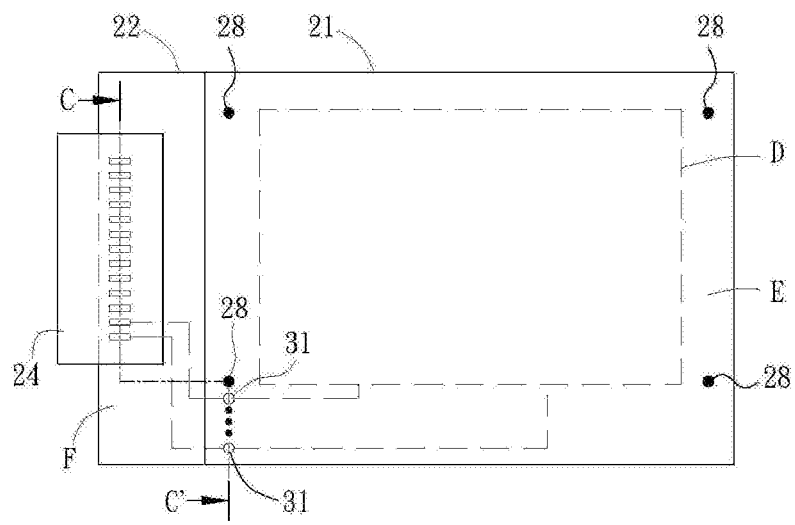
FIG. 2 is a schematic top view, showing a touch sensitive display according to the present invention.
Figure 3:
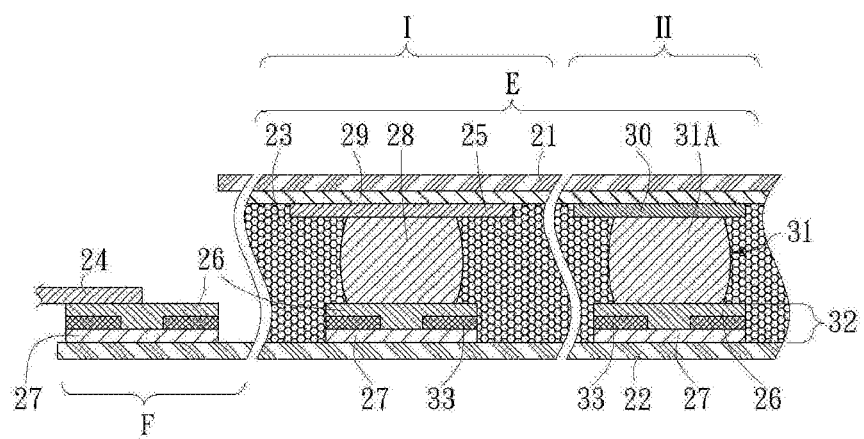
FIG. 3 is a schematic cross-sectional view taken along a sectional line C-C' in FIG. 2 according to a first embodiment of the present invention.

FIG. 2 is a schematic top view showing a touch sensitive display according to the embodiment of the present invention. FIG. 3 is a schematic cross-sectional view showing the touch sensitive display according to a first embodiment of the present invention, which shows the cross-sectional structure taken along a sectional line C-C' in FIG. 2. The Sensing Technology used in the embodiment of the present invention, the sensing layer or the touch sensing layer, can be one or more technologies responding to input(s) by generating output(s), including, but not limited to resistive, capacitive, optical sensing, infrared touch, acoustic sensing technology, (herein referred to as "Sensing Technology"). The touch sensitive display includes mainly a top substrate 21, a bottom substrate 22 and a liquid crystal layer 23 between the former two which together form a liquid crystal display. Specifically, the top substrate 21 is primarily used to sense the outside touch on the surface of the liquid crystal display to generate touch signals, while the bottom substrate 22 is used for receiving the touch signals and transmitting to a touch control circuit (not shown) for the touch control purpose. In the embodiment, the top substrate 21 and the bottom substrate 22 may be glass or plastic substrate, or other support substrates with similar function. Specifically, taking the color liquid-crystal display for example, the top substrate 21 with printed red, green and blue color photoresist is used as a Color Filter (CF) substrate, and the bottom substrate 22 with manufactured thin-film transistor array is used as a thin-film transistor array (TFT array) substrate. In addition, between the top substrate 21 and the bottom substrate 22 there is a top transparent conductive layer 25, a bottom transparent conductive layer 26 and a conductive circuit 27. In, the embodiment, the top transparent conductive layer 25 and the bottom transparent conductive layer 26 may be indium-tin oxide (ITO) layer or other materials having similar nature.

As shown in FIG. 2, the superimposed region between the top substrate 21 and the bottom substrate 22 may be defined as the display area (or active area) D and the peripheral area E, while the non-superimposed region between the bottom substrate 22 and the top substrate 21 is used as the bonding area F, coupled to a flexible circuit board 24, thereby transferring signals to and from a display control circuit and a touch control circuit (not shown).

In the embodiment, 4 (four) first conductive metals 28, such as silver conductive adhesive or conductive ink, are formed between the top transparent conductive layer 25 and the bottom transparent conductive layer 26 at the four corners in the peripheral area E, in the display relevant region I as shown in FIG. 3. Likewise, any conductive element, namely, copper, carbon, silver, aluminum, may be affixed to the conductive layer. According to the structure of the display relevant region L the control circuit (not shown) may transfer the control signals required for display, such as common voltage and so on, to the top transparent conductive layer 25 via the flexible circuit board 24, the bottom transparent conductive layer 26, the conductive circuit 27 and the first conductive metals 28. In addition, the peripheral area E of the touch sensitive display also forms a shielding layer 29, to shelter from the light, such as the black matrix (BM) layer.

According to the touch relevant region II shown in FIG. 3, between the top substrate 21 and the bottom substrate 22, from top to bottom, it mainly includes a shielding layer 29, a touch sensing layer 30, a conductive media 31 and a touch signal transfer circuit 32. Specifically, the touch sensing layer 30 is used to generate touch signals. The touch sensing layer 30 is divided into a touch sensing electrode layer and a touch sensing peripheral circuit layer. The former is mainly disposed in the display (active) area D, while the latter is disposed in the peripheral area E. In the embodiment, the touch signal transfer circuit 32 is used to transfer the touch signals to the touch control, circuit (not shown), and the touch signal transfer circuit 32 includes a bottom transparent conductive layer 26, a conductive circuit 27 and the insulating layer 33 between the former two. In other embodiment, the touch signal transfer circuit 32 may include only the conductive circuit 27. In general, the layers, composition and arrangement of the touch signal transfer circuit 32 are not limited to those shown in FIG. 3. Similarly, the layers of the touch sensing peripheral circuit layer are not limited to those shown in FIG. 3, which may be a circuit made of two composite conductive layers. In the embodiment, the conductive media 31 is used for electrically transferring touch signals, and the conductive media 31 includes the second conductive metal 31A, such as silver conductive adhesive or conductive ink or other conductive elements.

Figure 1A:
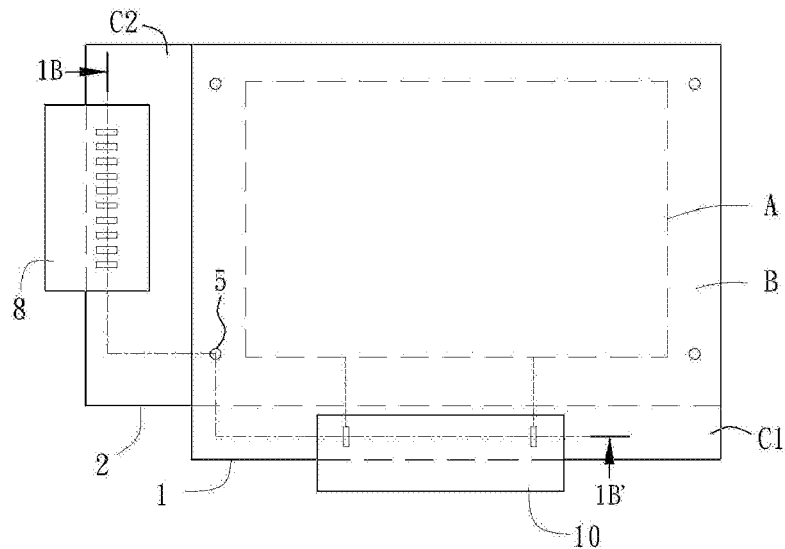
FIG. 1A is a schematic top view showing a conventional touch sensitive display.
Figure 1B:
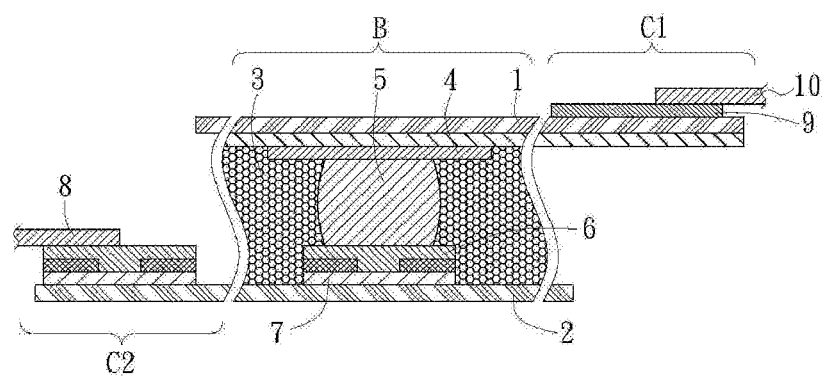
FIG. 1B is a schematic cross-sectional view taken along a sectional line 1B-1B' in FIG. 1A.

It is noteworthy that the display components and touch components of the conventional touch sensitive display (FIG. 1B) are coupled to both sides of the top substrate 1 respectively, resulting in different manufacturing steps on both sides of the substrate, while the touch sensing layer 30 of the present embodiment is formed below the top substrate 21. As a result, display related components and touch related components are all manufactured below the top substrate 21, (With respect to the conventional touch sensitive display (FIG. 1B), some components need to be manufactured completely on the top substrate 1.) Therefore, in the present embodiment, there is no need to perform manufacturing steps on both sides of the top substrate 21, and it is only necessary to complete all of the manufacturing steps on one side of the top substrate 21. Therefore efficiency is increased. Accordingly, the touch sensitive display disclosed in the embodiment is also referred to as the embedded touch sensitive display.

According to the structure described in FIG. 3, the touch signals generated in the display area D may be transferred to the touch control circuit (not shown) via the touch sensing layer 30, the conductive media 31, the touch signal transfer circuit 32, and (the bonding area F) the flexible circuit board 24. The touch signal transfer circuit transfers signals to the flexible circuit board electrically. In other words, display signals and touch signals may be input and output via the bottom substrate 22. According to the structure disclosed in the embodiment, the touch signal transfer interface can be integrated with the display signal interface on the bottom substrate 22, sharing the same flexible circuit board 24, or belonging to different flexible circuit boards combined with the bonding area F of the bottom substrate 22 simultaneously. The bonding area of the top substrate 21 can be omitted. Therefore, the purpose of miniaturization is achieved.

Figure 4A:
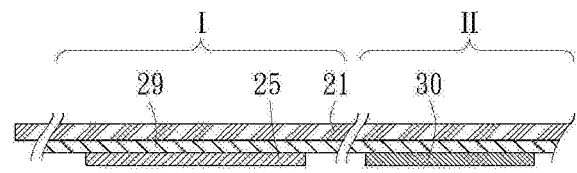
FIG. 4A to FIG. 4C are schematic cross-sectional views illustrating manufacturing steps of the touch sensitive display according to the first embodiment of the present invention.
Figure 4B:
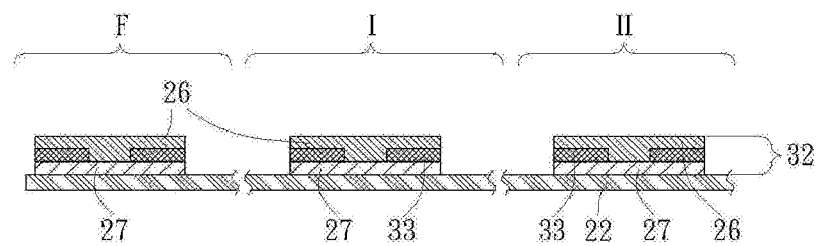
Figure 4C:
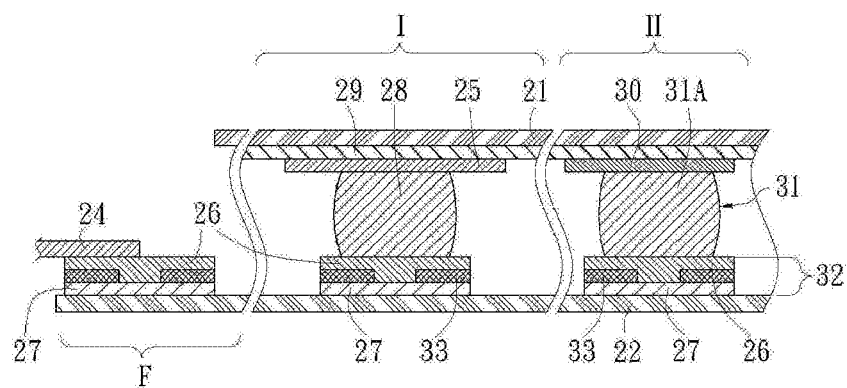

FIG. 4A to FIG. 4C are schematic cross-sectional views illustrating manufacturing steps of the touch sensitive display according to the first embodiment of the present invention. As shown in FIG. 4A, firstly, a shielding layer 29 is formed below the top substrate 21 in the display relevant region I and the touch relevant region II. Then a top transparent conductive layer 25 is formed below the shielding layer 29 in the display relevant region I, and a touch sensing layer 30 is formed below the shielding layer 29 in the touch relevant region II. The color filter layer may be disposed below the shielding layer 29 according to various needs. The color filter layer is not depicted in the drawing.

Subsequently, as shown in FIG. 4B, a conductive circuit 27, an insulating layer 33 and a bottom transparent conductive layer 26, which together form a touch signal transfer circuit 32, and which are formed in sequence above the bottom substrate 22. In other embodiment, the layers, composition and arrangement of the touch signal transfer circuit 32 are not limited to those shown in FIG. 4B. Furthermore, the same conductive structures are formed in the bonding area F, the display relevant region I and the touch relevant region II in the embodiment. However, in other embodiment, different conductive structures may be formed.

Finally, as shown in FIG. 4C, the top substrate 21 and the bottom substrate 22 are laminated together, and accordingly, the touch signals may be transferred between the top substrate 21 and the bottom substrate 22.

Figure 5:
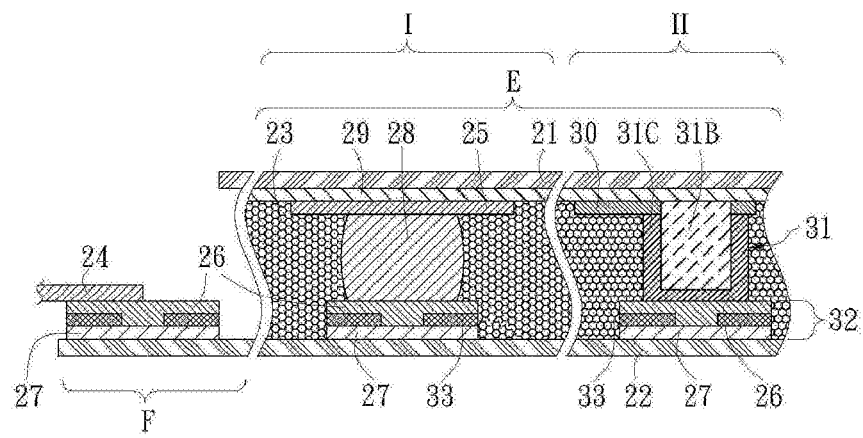
FIG. 5 is a schematic cross-sectional view showing the touch sensitive display according to a second embodiment of the present invention.

FIG. 5 is a schematic cross-sectional view showing the touch sensitive display according, to a second embodiment of the present invention, which shows the cross-sectional structure taken along a sectional line C-C' in FIG. 2. The structure of the second embodiment is similar to the structure of the first embodiment (FIG. 3), and the difference is that the conductive media 31 of the second embodiment is composed of a space point 31B and a conductive film 31C. Specifically, the space point 31B is used to spatially separate the top substrate 21 and the bottom substrate 22; and the conductive film 31C covers the space point 31B, thereby forming the electrical conduction to the touch sensing layer 30 shown on the top side and the touch signal transfer circuit 32 shown on the bottom side in order to transfer the touch signals. Although the conductive film 31C and the touch sensing layer 30 are individually described with different functions, they may be formed simultaneously in the manufacturing process. In the embodiment, the space point 31B may include photoresist material, formed with exposure development manufacturing process; or may include insulating material, formed with print process. In addition, the space point 31B may include single or multiple shielding layers (such as black matrix layer), or single or multiple layers of colorresist layer, or their combination.

Figure 6A:
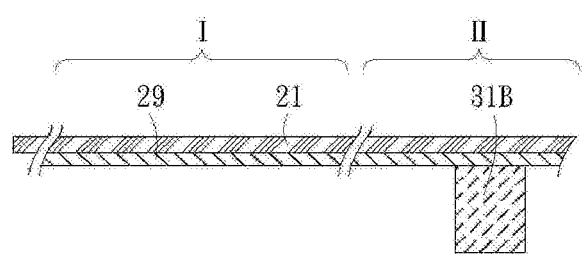
FIG. 6A to FIG. 6D are schematic cross-sectional views illustrating manufacturing steps of the touch sensitive display according to the second embodiment of the present invention.

FIG. 6A to FIG. 6D are schematic cross-sectional views illustrating manufacturing steps of the touch sensitive display according to the second embodiment of the present, invention. To simplify the illustration, the color filter layer is not shown. As shown in FIG. 6A, firstly, a shielding layer 29 is formed below the top substrate 21 in the display relevant region I and the touch relevant region II. Then a space point 31B is formed below the shielding layer 29 in the touch relevant region II.

Figure 6B:
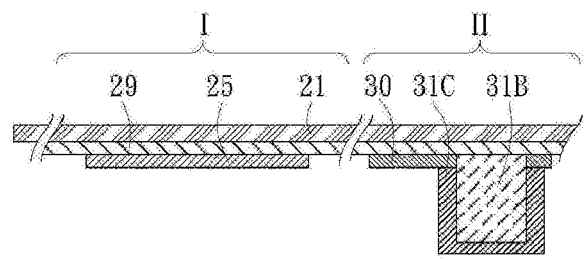

Subsequently, as shown in FIG. 6B, a conductive film 31C is disposed on the space point 31B, and a touch sensing layer 30 and a top transparent conductive layer 25 are formed below the shielding layer 29. Especially, the conductive film 31C, the touch sensing layer 30 and the top transparent conductive layer 25 may be formed simultaneously or separately.

Figure 6C:
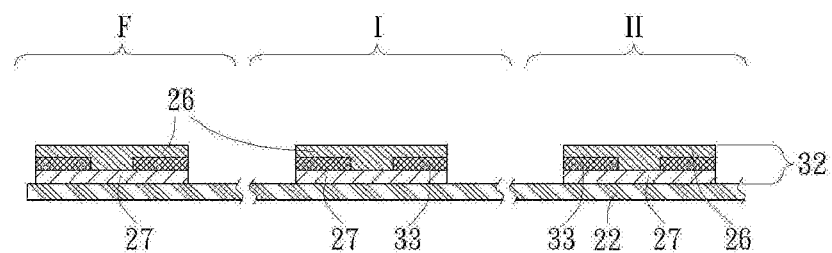

Subsequently, as shown in FIG. 6C, a conductive circuit 27, an insulating layer 33 and a bottom transparent conductive layer 26, which together form a touch signal transfer circuit 32, and which are formed in sequence above the bottom substrate 22. In other embodiment, the layers, composition and arrangement of the touch signal transfer circuit 32 are not limited to those shown in FIG. 6C. Furthermore, the same conductive structures are formed in the bonding area F, the display relevant region I and the touch relevant region II in the embodiment. However, in other embodiment, different conductive structures may be formed.

Figure 6D:
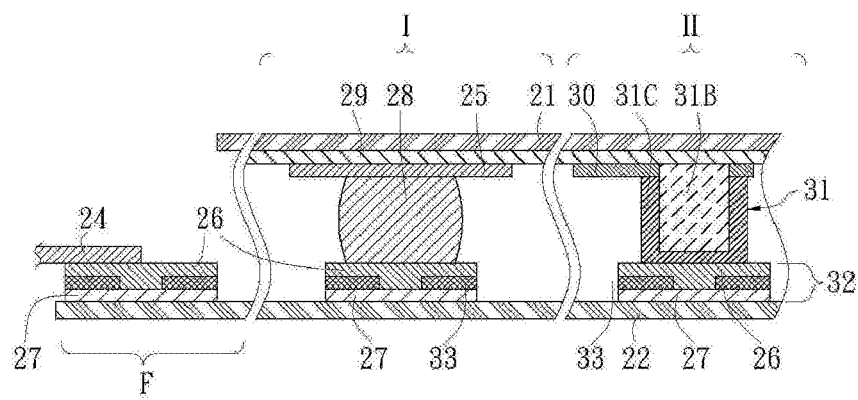

Finally, as shown in FIG. 6D, the top substrate 21 and the bottom substrate 22 are laminated together, and accordingly, the touch signals may be transferred between the top substrate 21 and the bottom substrate 22.

Figure 7:
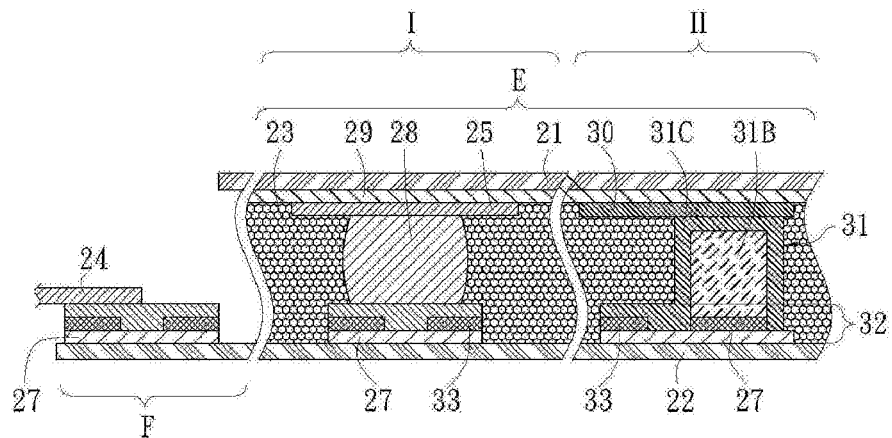
FIG. 7 is a schematic cross-sectional view showing the touch sensitive display according, to a third embodiment of the present invention.

FIG. 7 is a schematic cross-sectional view showing the touch sensitive display according to a third embodiment of the present invention, which shows the cross-sectional structure taken along a sectional line C-C' in FIG. 2. The structure of the third embodiment is similar to the structure of the second embodiment (FIG. 5), and the difference is that the space point 31B of the third embodiment is formed above the bottom substrate 22, rather than formed below the top substrate 21 as shown in the second embodiment (FIG. 5).

Figure 8A:
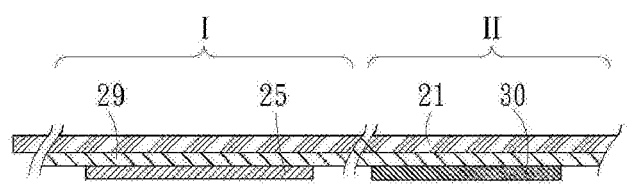
FIG. 8A to FIG. 8D are schematic cross-sectional views illustrating manufacturing steps of the touch sensitive display according to the third embodiment of the present invention.
Figure 8B:
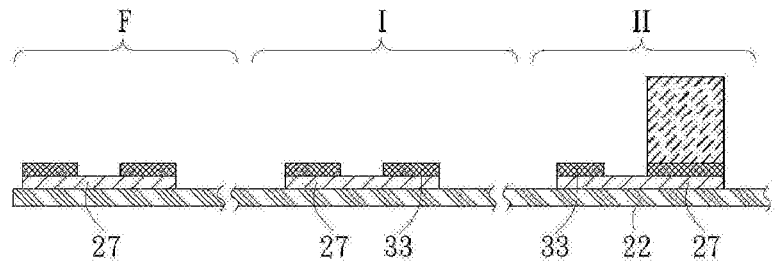
Figure 8C:
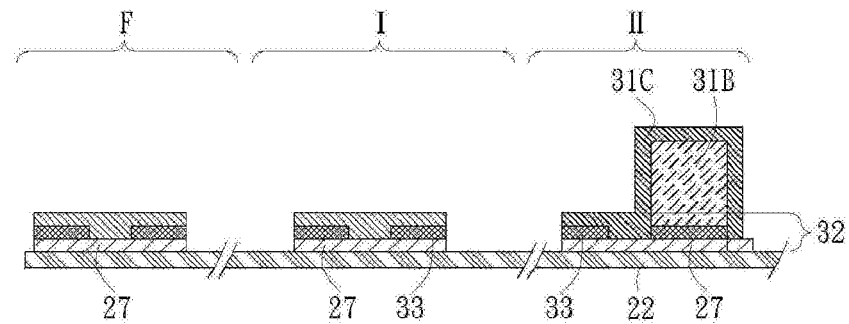
Figure 8D:
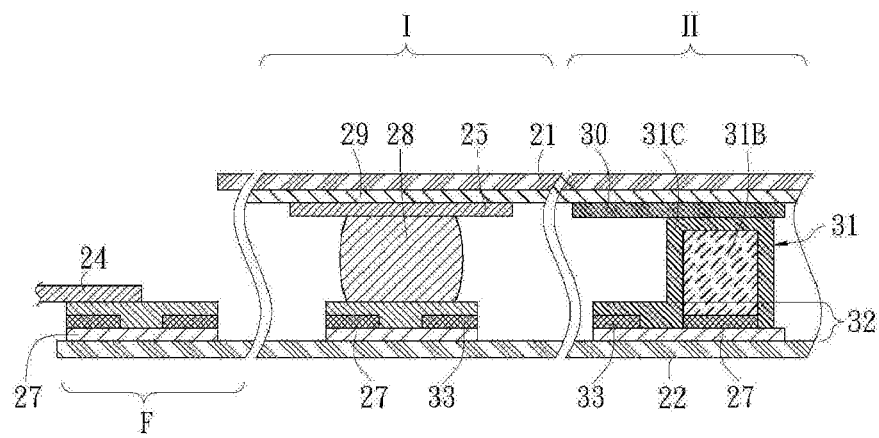

FIG. 8A to FIG. 8D are schematic cross-sectional views illustrating manufacturing steps of the touch sensitive display according to the third embodiment of the present invention, which are similar to the manufacturing steps of the second embodiment (FIG. 6A to FIG. 6D), and the difference is that the space point 31B is formed above the insulating layer 33 of the touch signal transfer circuit 32. Subsequently, as shown in FIG. 8C, a conductive film 31C is formed above the space point 31B. Finally, as shown in FIG. 8D, the top substrate 21 and the bottom substrate 22 are laminated together, and accordingly, the touch signals may be transferred between the top substrate 21 and the bottom substrate 22.

Although specific embodiments have been illustrated and described, it will be appreciated by those skilled in the art that various modifications may be made without departing from the scope of the present invention, which is intended to be limited solely by the appended claims.

What is claimed is:
1. An embedded touch sensitive display, comprising:
a top substrate;
a bottom substrate;
a liquid crystal layer configured between the top substrate and the bottom substrate;
an integrated interface disposed on the bottom substrate, wherein the embedded touch sensitive display has a display control circuit and a touch control circuit, the integrated interface is coupled to the display control circuit and the touch control circuit;
a display relevant module and a touch relevant module, connected to the integrated interface;
wherein the touch relevant module having:
a touch sensing layer disposed below the top substrate;
a touch signal transfer circuit disposed above the bottom substrate, wherein the touch signal transfer circuit further comprises a conductive circuit, a bottom transparent conductive layer and an insulating layer disposed between the conductive circuit and the bottom transparent conductive layer; and
a conductive media disposed between the touch sensing layer and the touch signal transfer circuit, wherein a touch signal is transferred between the touch control circuit and the touch relevant module through the integrated interface, and a display controlling signal is transferred between the display control circuit, and the display relevant module through the integrated interface.

2. The display of claim 1, wherein the touch sensing layer comprises a touch sensing electrode layer and a touch sensing peripheral circuit layer.

3. The display of claim 2, wherein the touch sensing peripheral circuit layer, the touch signal transfer circuit and the conductive media are disposed in a peripheral area of the touch sensitive display.

4. The display of claim 1, wherein the touch signal transfer circuit is coupled to the touch control circuit on a flexible circuit board.

5. The display of claim 1, wherein the display relevant module and the touch relevant module are disposed in a peripheral bonding area of the bottom substrate.

6. The display of claim 1, further comprising a shielding layer formed in a peripheral area of the embedded touch sensitive display.

7. The display of claim 1, wherein the conductive media comprises at least one conductive element.

8. The display of claim 1, wherein the conductive media comprises at least one of a) silver conductive ink and b) silver conductive adhesive.

9. The display of claim 1, wherein the conductive media comprises:
a space point formed below the top substrate; and
a conductive film covering the space point, wherein the conductive film is electrically connected between the touch sensing layer and the touch signal transfer circuit.

10. The display of claim 9, wherein the space point comprises at least one of the following: a single shielding layer, multiple shielding layers, a single colorresist layer, and multiple colorresist layers.

11. The display of claim 9, wherein the space point is made of a photo-resist material.

12. A method of manufacturing an embedded touch sensitive display, comprising:
providing a top substrate, a bottom substrate and an integrated interface formed on the bottom substrate; and
forming a display relevant module and a touch relevant module between the top substrate and the bottom substrate, wherein the integrated interface is connected to the display relevant module and the touch relevant module, and the step of forming the touch relevant module comprises:
forming a touch sensing layer below the top substrate;
forming a touch signal transfer circuit above the bottom substrate, wherein the step of forming the touch signal transfer circuit further comprises forming a conductive circuit, a bottom transparent conductive layer and an insulating layer disposed between the conductive circuit and the bottom transparent conductive layer; and
forming a conductive media between the touch sensing layer and the touch signal transfer circuit, wherein the embedded touch sensitive display has a display control circuit and a touch control circuit, a touch signal is transferred between the touch control circuit and the touch relevant module through the integrated interface, and a display controlling signal is transferred between the display control circuit and the display relevant module through the integrated interface.

13. The method of claim 12, wherein the step of forming the touch sensing layer comprises forming a touch sensing electrode layer and a touch sensing peripheral circuit layer.

14. The method of claim 13, wherein the touch sensing peripheral circuit layer, the touch signal transfer circuit and the conductive media are formed in a peripheral area of the touch sensitive display.

15. The method of claim 12, further comprising forming a flexible circuit board having the display control circuit and the touch control circuit in a peripheral bonding area of the bottom substrate.

16. The method of claim 12, further comprising forming a shielding layer in a peripheral area of the embedded touch sensitive display.

17. The method of claim 12, wherein forming the conductive media comprises affixing at least one conductive element.

18. The method of claim 12, wherein forming the conductive media comprises at least one of the steps of a) affixing silver conductive ink and b) affixing silver conductive adhesive.

19. The method of claim 12, wherein the step of forming the conductive media comprises:
forming a space point formed below the top substrate; and
forming a conductive film covering the space point, wherein the conductive film is electrically connected between the touch sensing layer and the touch signal transfer circuit.

20. The method of claim 19, wherein the step of forming the space point comprises at least one of the following steps: forming a single shielding layer, forming multiple shielding layers, forming a single colorresist layer and forming multiple colorresist layers.

21. The method of claim 19, wherein the step of forming the space point comprises forming a photo-resist material as the space point.

22. A display, comprising:
a touch relevant module and a display relevant module, the touch relevant module comprising:
a touch sensing layer disposed below a top substrate;
a touch signal transfer circuit disposed above a bottom substrate, wherein the touch signal transfer circuit further comprises a conductive circuit, a bottom transparent conductive layer and an insulating layer disposed between the conductive circuit and the bottom transparent conductive layer; and
a conductive media disposed between the top substrate and the bottom substrate; and
an integrated interface coupled to the display relevant module and the touch relevant module.

23. The display of claim 22, wherein the conductive media comprises: a space point between the top substrate and the bottom substrate; and a conductive film covering the space point, wherein the conductive film is electrically connected between the touch sensing layer and the touch signal transfer circuit.

24. A display, comprising:
a touch relevant module and a display relevant module, the touch relevant module comprising:
a sensing layer disposed below a top substrate for sensing outside touch and generating resultant touch signals;
a touch signal transfer circuit disposed above a bottom substrate for receiving touch signals for controlling, wherein the touch signal transfer circuit further comprises a conductive circuit, a bottom transparent conductive layer and an insulating layer disposed between the conductive circuit and the bottom transparent conductive layer; and
a conductive media disposed between the top substrate and the bottom substrate for electrically transferring touch signals;
an integrated interface coupled to the display relevant module and the touch relevant module;
wherein the display has a display control circuit and a touch control circuit, the touch signals are transferred between the touch control circuit and the touch relevant module through the integrated interface, and display controlling signals are transferred between the display control circuit and the display relevant module through the integrated interface.

25. The display of claim 24, wherein the sensing layer comprises a resistive sensing layer, a capacitive sensing layer, an optical sensing layer, an infrared touch sensing layer or an acoustic sensing layer.

26. An embedded touch sensitive display, comprising:
a top substrate;
a bottom substrate;
a liquid crystal layer configured between the top substrate and the bottom substrate;

an integrated interface disposed on the bottom substrate, wherein the embedded touch sensitive display has a display control circuit and a touch control circuit, the integrated interface is coupled to the display control circuit and the touch control circuit; and a display relevant module and a touch relevant module, connected to the integrated interface;

wherein the touch relevant module having:

a touch sensing layer disposed below the top substrate;

a touch signal transfer circuit disposed above the bottom substrate; and a conductive media disposed between the touch sensing layer and the touch signal transfer circuit, wherein the conductive media comprises a space point and a conductive film covering the space point, and wherein the space point comprises at least one of the following: a single shielding layer, multiple shielding layers, a single colorresist layer, and multiple colorresist layers;

wherein a touch signal is transferred between the touch control circuit and the touch relevant module through the integrated interface, and a display controlling signal is transferred between the display control circuit and the display relevant module through the integrated interface.

27. The embedded touch sensitive display of claim 26, wherein the single shielding layer is a single black matrix layer, and the multiple shielding layers are multiple black matrix layers.

28. The embedded touch sensitive display of claim 26, wherein the touch sensing layer comprises a touch sensing electrode layer and a touch sensing peripheral circuit layer.

29. The embedded touch sensitive display of claim 26, wherein the touch signal transfer circuit is coupled to the touch control circuit on a flexible circuit board.

30. The embedded touch sensitive display of claim 26, wherein the display relevant module and the touch relevant module are disposed in a peripheral bonding area of the bottom substrate.

31. A method of manufacturing an embedded touch sensitive display, comprising:

providing a top substrate, a bottom substrate and an integrated interface formed on the bottom substrate; and forming a display relevant module and a touch relevant module between the top substrate and the bottom substrate, wherein the integrated interface is connected to the display relevant module and the touch relevant module, the step of forming the touch relevant module comprises:

forming a touch sensing layer below the top substrate;

forming a touch signal transfer circuit above the bottom substrate; and forming a conductive media between the touch sensing layer and the touch signal transfer circuit, wherein the step of forming the conductive media comprises: forming a space point and forming a conductive film covering the space point, and wherein the step of forming the space point comprises at least one of the following steps: forming a single shielding layer, forming multiple shielding layers, forming a single colorresist layer and forming multiple colorresist layers;

wherein the embedded touch sensitive display has a display control circuit and a touch control circuit, a touch signal is transferred between the touch control circuit and the touch relevant module through the integrated interface, and a display controlling signal is transferred between the display control circuit and the display relevant module through the integrated interface.

32. The method of claim 31, wherein the step of forming the touch sensing layer comprises forming a touch sensing electrode layer and a touch sensing peripheral circuit layer.

33. The method of claim 31, further comprising disposing a flexible circuit board having the display control circuit and the touch control circuit in a peripheral bonding area of the bottom substrate.

34. A display, comprising:

a touch relevant module and a display relevant module, the touch relevant module comprising:

a touch sensing layer disposed below a top substrate;

a touch signal transfer circuit disposed above a bottom substrate; and a conductive media disposed between the top substrate and the bottom substrate, wherein the conductive media comprises a space point and a conductive film covering the space point, and wherein the space point comprises at least one of the following: a single shielding layer, multiple shielding layers, a single colorresist layer, and multiple colorresist layers;

an integrated interface coupled to the display relevant module and the touch relevant module.

35. The display of claim 34, wherein the single shielding layer is a single black matrix layer, and the multiple shielding layers are multiple black matrix layers.

36. A display, comprising:

a touch relevant module and a display relevant module, the touch relevant module comprising:

a sensing layer disposed below a top substrate for sensing outside touch and generating resultant touch signals;

a touch signal transfer circuit disposed above a bottom substrate for receiving touch signals for controlling; and a conductive media disposed between the top substrate and the bottom substrate for electrically transferring touch signals, wherein the conductive media comprises a space point and a conductive film covering the space point, and wherein the space point comprises at least one of the following: a single shielding layer, multiple shielding layers, a single colorresist layer, and multiple colorresist layers;

an integrated interface coupled to the display relevant module and the touch relevant module;

wherein the display has a display control circuit and a touch control circuit, the touch signals are transferred between the touch control circuit and the touch relevant module through the integrated interface, and display controlling signals are transferred between the display control circuit and the display relevant module through the integrated interface.

37. The display of claim 36, wherein the single shielding layer is a single black matrix layer, and the multiple shielding layers are multiple black matrix layers.

38. The display of claim 36, wherein the sensing layer comprises a resistive sensing layer, a capacitive sensing layer, an optical sensing layer, an infrared touch sensing layer or an acoustic sensing layer.

* * * * *